Dec. 30, 1924.
J. W. JOHANSSON
PLOW
Filed April 3, 1922
1,521,299
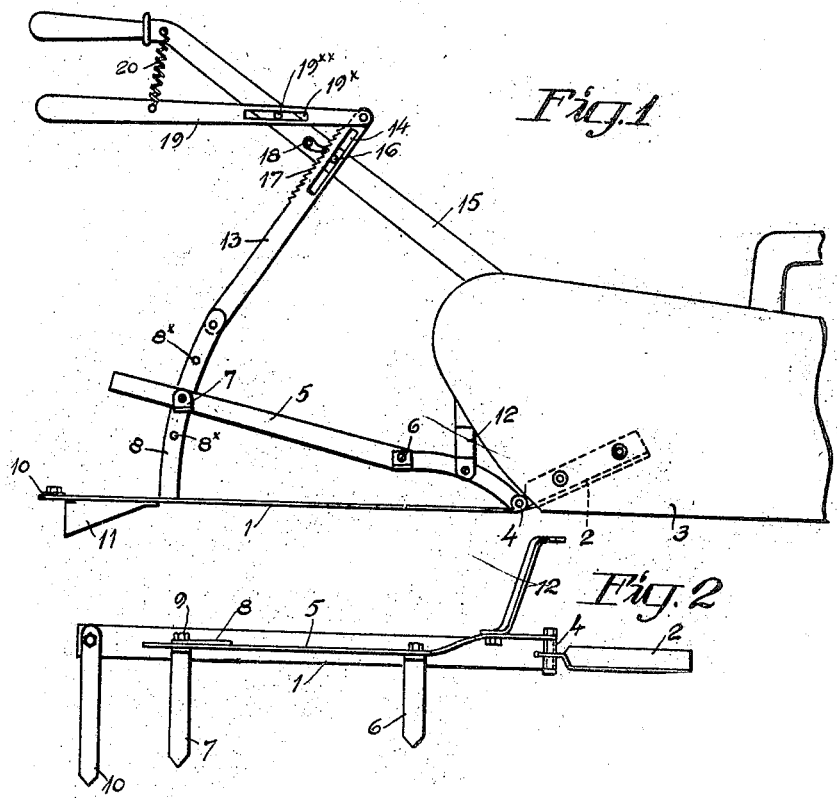
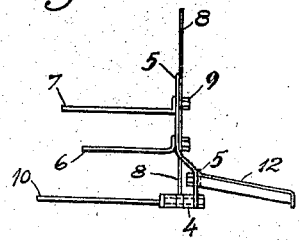
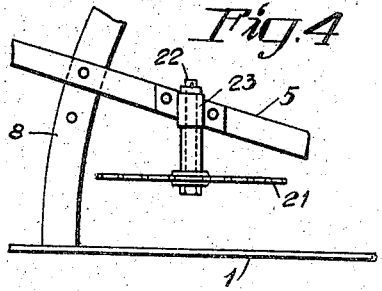
Inventor
J. W. Johansson
By Marks & Clerk
Attys Patented Dec. 30, 1924.

1,521,299

UNITED STATES PATENT OFFICE.

JOHAN WILLIAM JOHANSSON, OF NJURUNDA, SWEDEN.

PLOW.

Application filed April 3, 1922. Serial No. 549,320.

*To all whom it may concern:*

Be it known that I, JOHAN WILLIAM JOHANSSON, a subject of the King of Sweden, residing at Njurunda, Sweden, have invented certain new and useful Improvements in Plows, of which the following is a specification.

This invention relates to plow attachments for plows having cutting members for simultaneously cutting the ridge into layers as the ridge is turned by the main plow body. The characteristic feature of the invention consists in arranging the cutting members on a separate frame pivotally connected to the plow body in combination with a manually operable member for raising or lowering the cutting members as desired.

In the accompanying drawing a form of the invention is shown as an example. Fig. 1 is a side view of a skeleton frame carrying the cutting members and connected with the plow-body. Figs. 2 and 3 are a plan view and a front view respectively of the frame. Figs. 4 and 5 show on a greater scale details of a modified form.

The numeral 1 designates a slide bar, the fore end of which is hinged at 4 to a plate 2 or the like, adapted to be fixed to the inner side of the plowshare 3. The said hinge 4 also connects a bar 5 with the plate 2, the said bar carrying horizontal, disengageable cutting blades 6 and 7. To the slide bar 1 a curved upright 8 is fixed, the center of curvature of which coincides with the hinge 4. The said upright 8 is provided with holes $8^x$. According to the drawing the bar 5 is fixed to the upright 8 by the screw-threaded shaft of the blade 7 being slid through a hole in the bar 5 and one of the said holes $8^x$ and provided with a nut 9. In this manner the knives 6 and 7 may be located at a higher or lower level in respect of the slide bar 1, and thus caused to cut at different depths of the furrows. A horizontal cutting blade 10 is fixed to the slide bar 1 in a detachable manner.

In order to prevent the hinge 4 from being subjected to a lateral straining caused by the resistance of the soil to the blades a vertical guide tongue 11 is provided on the rear end of the slide bar 1 and besides a stay 12 is fixed to the bar 5 and to the plow in any suitable manner.

A bar 13 is swingably connected with the top end of the upright 8 and provided with a slot 14 engaging a pin 16 fixed to one of the handle bars 15 of the plow. A pawl 18 engages teeth 17 provided on the bar 13. A lever arm 19 is pivoted to the top end of the rod 13 and provided with a slot $19^x$ engaging a pin $19^{xx}$ fixed to the said handle bar 15. A powerful helical spring 20 is provided between the said hand-lever 19 and the handle bar 15. The said spring 20 forces the slide bar 1 against the ground during the operation of the plow. When the plow is to be transported, the lever-arm 19 is forced downwards against the action of the spring 20, so the bar 1 is sufficiently raised. The pawl 18 then holds the bar 1 in its raised position.

In Fig. 4 a rotary disc-shaped blade 21 is shown. The said blade 21 is fixed in a detachable manner to a spindle 22, journaled in a bearing 23, fixed to the bar 5. The blade 21, preferably, has the shape shown in Fig. 5, i. e. is provided with teeth 24, the notches 25 between the teeth being sharp-edged.

The two types of blades described above may, evidently, be used simultaneously or separately. The blades may be fixed to the plow body directly, if desired. The invention may be modified in some other respects without exceeding the limits of same. For instance a toothed wheel and a rack may be substituted for the toothed bar 13 and the pawl 18. Instead of screw and nut a screw clamp may be used for fixing the bar 5 to the upright 8, the holes $8^x$ being thereby rendered superfluous.

During the operation of the plow the blades 6, 7 and 10 or 21 loosen the soil and destroy the weeds, thus facilitating the subsequent working of the soil.

I claim:

An attachment for a plow comprising a separate frame pivotally connected to the body of the plow including a slide bar, a second bar also pivotally connected to the plow body, an upright on the bar, means for adjustably connecting the second bar with the upright, rotatable disc-like cutting members arranged on the frame for simultaneously cutting the ridge into layers as the ridge is turned by the plow body, and a manually operable member connected with the upright for raising or lowering the cutting members, substantially as and for the purposes set forth.

In testimony whereof I have affixed my signature in presence of two witnesses.

JOHAN WILLIAM JOHANSSON.

Witnesses:
 ROBERT APELGREN,
 S. SWENSON.